(12) United States Patent
Deng et al.

(10) Patent No.: US 12,106,158 B2
(45) Date of Patent: Oct. 1, 2024

(54) FAIR TASK OFFLOADING AND MIGRATION METHOD FOR EDGE SERVICE NETWORKS

(71) Applicant: ZHEJIANG UNIVERSITY ZHONGYUAN INSTITUTE, Zhengzhou (CN)

(72) Inventors: Shuiguang Deng, Hangzhou (CN); Cheng Zhang, Hangzhou (CN); Jianwei Yin, Hangzhou (CN)

(73) Assignee: ZHEJIANG UNIVERSITY ZHONGYUAN INSTITUTE, Zhengzhou (CN)

( * ) Notice: Subject to any disclaimer, the term of this patent is extended or adjusted under 35 U.S.C. 154(b) by 0 days.

(21) Appl. No.: 18/290,280

(22) PCT Filed: Feb. 22, 2023

(86) PCT No.: PCT/CN2023/077586
§ 371 (c)(1),
(2) Date: Nov. 10, 2023

(87) PCT Pub. No.: WO2024/036909
PCT Pub. Date: Feb. 22, 2024

(65) Prior Publication Data
US 2024/0264883 A1    Aug. 8, 2024

(30) Foreign Application Priority Data

Aug. 17, 2022   (CN) .......................... 202210994286.4

(51) Int. Cl.
*G06F 9/46*      (2006.01)
*G06F 9/48*      (2006.01)
(Continued)

(52) U.S. Cl.
CPC .......... *G06F 9/5088* (2013.01); *G06F 9/4856* (2013.01); *G06F 9/54* (2013.01); *G06F 2209/509* (2013.01); *G06F 2209/541* (2013.01)

(58) Field of Classification Search
CPC ..................................................... G06F 9/5088
(Continued)

(56) References Cited

U.S. PATENT DOCUMENTS

2020/0401938 A1    12/2020   Etkin et al.

FOREIGN PATENT DOCUMENTS

| CN | 109362087 | 2/2019 |
| CN | 110062026 | 7/2019 |
| CN | 111148174 | 5/2020 |

*Primary Examiner* — Mehran Kamran
(74) *Attorney, Agent, or Firm* — Jiwen Chen; Joywin IP Law PLLC (57) ABSTRACT

The present invention discloses a fair task offloading and migration method for edge service networks, taking the Pareto optimality of the utility function of all user tasks executed by the edge system as the optimization objective, this approach not only takes into account the constraints of edge network resources, but also ensures the maximization of the utility function of all user tasks in the system, it proposes a new quantitative measurement index for improving the task utility quality under multi-user competition. In addition, the present invention uses the graph neural network and reinforcement learning algorithm to solve the final optimization goal, this algorithm has high execution efficiency and returns accurate approximate results, which is particularly suitable for the scene of edge network system under multi-user complex tasks, so that when multi-user tasks compete for network resources, the edge computing network system can efficiently obtain the Pareto optimal result of multi-user utility function, greatly improving the service quality and user experience of edge network environments.

7 Claims, 3 Drawing Sheets

(51) Int. Cl.
*G06F 9/50* (2006.01)
*G06F 9/54* (2006.01)

(58) Field of Classification Search
USPC .......................................................... 718/100
See application file for complete search history.

FAIR TASK OFFLOADING AND MIGRATION METHOD FOR EDGE SERVICE NETWORKS

This is a U.S. national stage application of PCT Application No. PCT/CN2023/077586 under 35 U.S.C. 371, filed Feb. 22, 2023 in Chinese, claiming priority of Chinese Application No. 202210994286.4, filed Aug. 17, 2022, all of which are hereby incorporated by reference.

TECHNICAL FIELD

The present invention belongs to the technical field of load balancing on edge computing network, in particular to a fair task offloading and migration method for edge service networks.

DESCRIPTION OF RELATED ART

In recent years, with the increasing popularity of edge computing technology, the user computing load offloading and migration technology has developed rapidly. However, server resources and link resources in the edge environment are often scarce, resulting in servers in the edge environment may not be able to support all current service types; due to the limited variety of services deployed on the server, some user tasks require migration through the current server to be executed on other servers. In response to the mobility of users and the diversity of server requests in edge network environments, and the limited computing resources of edge servers in the region, it is worth researching how to reasonably allocate different computing resources and network bandwidth resources to different users based on fair execution of these user computing offloading loads, in order to ensure that the service experience of all users reaches a fair state.

Figure 3:
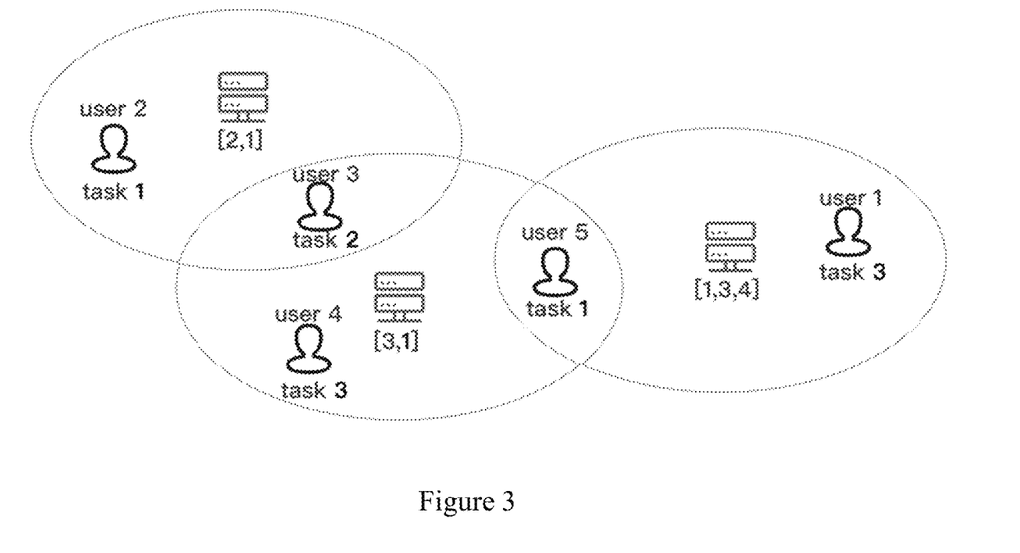
FIG. 3 is a schematic diagram of the edge network system.

Each user has personalized needs, such as bandwidth sensitive tasks (such as live streaming services, video on demand services, etc.), and computing sensitive tasks (such as AI algorithm calculation tasks, virtual reality graphics rendering tasks, etc.); the existing research on service algorithms of edge computing networks for real-time task response needs mostly focuses on the overall efficiency of tasks, from the perspective of network bandwidth and server resource utilization, it is relatively rare to consider Pareto solutions for the utility needs of multiple different user individuals. Due to the marginal effect of the user utility function, allocating different types and quantities of resources to users may not necessarily achieve the highest overall utility for a single user; in addition, in an edge network environment with limited overall resources, there are resource allocation conflicts among multiple users, which makes it difficult to fully meet the personalized needs of users and achieve Pareto optimization solutions. In the edge network environment shown in FIG. 3, there are 5 users and 3 edge servers. Users can choose to offload tasks to any edge server in the overlapping area of edge server services; how to select edge servers for task execution for users and schedule task migration between different servers, while maximizing the utility function for all users, is a challenging problem.

Reference [Yao Zewei, Lin Jiawen, Hu Junqin, et al. PSO-GA Based Approach to Multi-edge Load Balancing [J]. Computer Science, 2021, 48(S02):8] proposed a method for balancing edge environment load, with the goal of minimizing the maximum response time of user tasks, using heuristic algorithms to make decisions on user tasks, so that multiple user tasks are assigned to different servers for execution. Reference [Liang Bing, Ji Wen. Multiuser computation offloading for edge-cloud collaboration using submodular optimization[J]. Journal on Communications, 2020, 41 (10): 12] proposed the problem of maximizing the user's utility function, which simply adds and sums the user's utility, with the goal of maximizing the efficiency of all tasks and scheduling user tasks for execution. The above two strategies cannot guarantee that all users' tasks are executed fairly, and may result in sacrificing the quality of service of certain individual users for improving overall performance, resulting in excessive execution time of certain user tasks or a decrease in user's utility function.

SUMMARY THE PRESENT INVENTION

In response to the marginal effect of resources demand for users and the nonlinear conflict of resources allocation, the present invention provides a fair task offloading and migration method for edge service networks under network operation, which can greatly improve the overall utility requirements of all users and achieve Pareto optimality for all users in edge network environments with limited resources.

A fair task offloading and migration method for edge service networks, comprising the following steps:
(1) detecting task requests of mobile users in the edge network, and determining all currently detected user task requests;
(2) enumerating migration paths of all user task requests transmitted to the edge server;
(3) establishing a fair utility evaluation function for evaluating user tasks;
(4) optimizing and solving the fair utility evaluation function, the migration path for each user task request can be determined.

Furthermore, for any user task request in step (2), the following three types of migration paths are enumerated:
E1 is a set of migration paths for edge servers directly connected to users;
E2 is a set of migration paths for edge servers that are indirectly connected to users in a single hop manner, and edge servers that are directly connected to users do not have processing capabilities;
E3 is a set of migration paths for edge servers that are indirectly connected to users in a single hop manner, and edge servers that are directly connected to users have processing capabilities.

Furthermore, an expression of the fair utility evaluation function is as follows:

$$\max U = (U_1, \ldots, U_N)^T$$

$$U_i = \sum_{k \in \mathcal{K}} w_k U_i^k, \quad U_i^k = \frac{x_{i,k}^{1-\alpha_i^k}}{1-\alpha_i^k}$$

$$\sum_{i_l \in N_\ell} trans(i_l) < c_l, \, l \in \varepsilon$$

$$\sum_{i_v \in N_v} comp(i_v) < c_v, \, v \in \mathcal{V}$$

among them: $U_i$ is the utility function for executing the i-th user task request, if the i-th user task request cannot be unloaded and executed, then $U_i = U_l$, and $U_l$ is a constant, i is a natural number and $1 \leq i \leq N$, N is the number of all users, $U_i^k$ is the utility value of resource k occupied by executing the i-th user task request, $w_k$ represents the weight of resource k, and $\mathcal{K}$ is the resource set, comprising bandwidth resources and computing resources, $\alpha_i^k$ represents a custom parameter for the personalized utility function of resource k for the i-th user task request, and $x_{i,k}$ represents the quantity value of resource k occupied by the i-th user task request; l represents any transmission link in the edge network, $\varepsilon$ represents a set of transmission links in the edge network, v represents any edge server in the edge network, $\mathcal{V}$ represents a set of edge servers in the edge network, $\mathcal{N}$ is the set of all user task requests that occupy the transmission link l, $\mathcal{N}$ is the set of all user task requests that are calculated on the edge server v, $i_l$ is any user task request in the set $\mathcal{N}$, $i_v$ is any user task request in the set $\mathcal{N}$, trans($i_l$) is the amount of the bandwidth resource occupied by the user task request $i_l$ on the transmission link l, comp($i_v$) is the amount of the computational resource occupied by the user task request $i_v$ on the edge server v, $c_l$ is the actual bandwidth upper limit of the transmission link l, and $c_v$ is the actual maximum computing power of the edge server v.

Each edge server can perform several services, and each user can only perform one service.

Furthermore, the specific process of optimizing and solving the fair utility evaluation function in step (4) is as follows:

4.1. establishing a user shared neural network layer and N user decision models, wherein the user shared neural network layer comprises a graph neural network and a nonlinear aggregation function, N represents the number of all users;

4.2. using the graph neural network to extract information about nodes and edges in the edge network, and combining this information into feature vectors; the nodes correspond to mobile users and edge servers in the edge network, and the edges correspond to the transmission links between mobile users and edge servers, as well as the transmission links between edge servers;

4.3 using the graph neural network to extract information about nodes and edges in the task feasible migration path subgraph, and combining the information into feature vectors;

4.4 for any migration path in the task feasible migration path subgraph, the graph neural network is used to extract the information of nodes and edges, and the information are combined into feature vectors;

4.5 inputting all the extracted feature vectors into each user decision model, and the user decision model outputs the selected probability of each migration path corresponding to the user task requests;

4.6 first determining the priority of each user task request for offloading, then determining the offloading migration path for each user's task request, and then offloading each user's task request based on the priority and offloading migration path.

Furthermore, the information of the edges comprises the bandwidth occupied by each user task request on the transmission links between the mobile users and the edge servers, as well as the actual bandwidth upper limit of the transmission links; the information of the nodes comprises the amount of computing resources required for user task requests and the actual maximum computing power of the edge servers.

Furthermore, the task feasible migration path subgraph corresponds one-to-one with the user task requests, which is composed of all user task migration paths corresponding to the request, the user task migration path represents a specific migration path used by the user task request to perform offloading.

Furthermore, the parameters $\theta_{user\ i}$ of the user decision model are optimized and solved through a reward function;

$$r_i = \frac{1}{T}\sum_t \max\{\eta(U_i(t+1) - U_i(t)), \delta\}$$

among them, $r_i$ represents the reward function of the i-th user decision model, $U_i(t+1)$ and $U_i(t)$ represents the utility function of executing the i-th user task request during the t+1 and t iterations, respectively, $\eta$ is a given parameter, t is a natural number, T is the total number of iterations, and $\delta$ is a positive smaller given parameter.

Furthermore, the parameters of the user shared neural network layer are iterated through the following formula until the utility function of all user task requests reaches Pareto optimality;

$$\theta_{share}(t+1) = \theta_{share}(t) - \sum_i \alpha_i \nabla_R \mathcal{L}_i(\theta_{share}, \theta_{user\ i})$$

among them, $\theta_{share}(t+1)$ and $\theta_{share}(t)$ represent the parameters of the user shared neural network layer during the t+1 and t iterations, respectively, $\alpha_i$ is the weight value of the reward function for the i-th user decision model, $\nabla_R$ represents calculating the partial derivative, $\mathcal{L}_i(\theta_{share}, \theta_{user\ i}) = 1/r_i$.

Furthermore, the weight value $\alpha_i$ is obtained by solving the following loss function by using the Frank Wolfe algorithm;

$$\min\left\|\sum_i \alpha_i \nabla_R \mathcal{L}_i(\theta_{share}, \theta_{user\ i})\right\|_2^2$$

wherein, $\|\ \|_2$ represents a 2-norm.

Furthermore, in step 4.6, for the selected probabilities of all migration paths requested by any user task, the highest of the first K selected probabilities is averaged as the priority for offloading the user task request, the migration path corresponding to the highest selected probability is taken as the offloading migration path by the user task request, with K being a natural number greater than 1.

The present invention takes the Pareto optimality of the utility function of all user tasks executed by the edge system as the optimization objective, this approach not only takes into account the constraints of edge network resources, but also ensures the maximization of the utility function of all user tasks in the system, it proposes a new quantitative measurement index for improving the task utility quality under multi-user competition. In addition, the present invention uses the graph neural network and reinforcement learning algorithm to solve the final optimization goal, this algorithm has high execution efficiency and returns accurate approximate results, which is particularly suitable for the scene of edge network system under multi-user complex tasks, so that when multi-user tasks compete for network resources, the edge computing network system can efficiently obtain the Pareto optimal result of multi-user utility function, greatly improving the service quality and user experience of edge network environments.

BRIEF DESCRIPTION OF THE DRAWINGS

FIG. 1 (a) is a schematic diagram of the network topology that user tasks can connect to.

FIG. 1 (b) is an enumeration diagram of feasible migration paths for user tasks.

DETAILED DESCRIPTION OF THE INVENTION

In order to provide a more specific description of the present invention, the following will provide a detailed explanation of the technical solution of the present invention in conjunction with the accompanying drawings and specific implementation methods.

A fair task offloading and migration method for edge service networks of the present invention, comprising the following steps:

(1) detecting task requests of mobile users in the edge network, and determining all currently detected user task requests;

(2) enumerating migration paths of all user task requests transmitted to the edge server;

(3) establishing a fair utility evaluation function for evaluating user tasks:

$$\max U, U=(U_1, \ldots, U_n)^T, n \in \mathcal{N}$$

among them: N represents the user set, and i represents the user index; if a user task can be executed by an edge server, the fair utility function representing the user is defined as follows; otherwise, $U_i=\delta$, and $\delta$ is a small normal number that is customized by the edge system environment in advance, this constant indicates that when user tasks can only be executed locally and cannot be migrated to the edge server for execution, user utility will be greatly reduced.

$$U_i = \sum_{k \in \mathcal{K}} w_k U_i^k, U_i^k = \frac{x_{i,k}^{1-\alpha_i^k}}{1-\alpha_i^k}$$

wherein, the parameter $\alpha_i^k$ represents the personalized utility function of each user for resource k, k represents the type of user resource demand, $w_k$ represents the weight of resource type, $\Sigma_{k \in \mathcal{K}} w_k = 1$, and $x_{i,k}$ represents the number of resource k occupied by user i, in this embodiment, K has two values: k=1 represents bandwidth resources, and k=2 represents computing resources.

Figure 1:
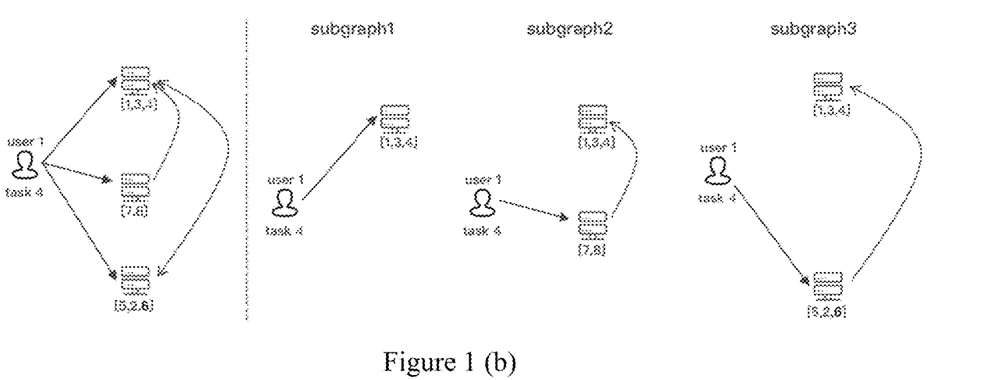

As shown in FIG. 1 (b), users and servers are viewed as the vertices of the graph, where the set of servers is represented by V, the set of transmission links between users and servers is represented by $\varepsilon$, the transmission link from user i to server j is represented by $l_{i,j}$, and the migration link from server j to server k is represented by $l_{jk}$, where i represents users, j, k represents edge servers, and i, j, and k belong to the set V, $l_{i,j}$ and $l_{jk}$ belong to the set $\varepsilon$, and each link in the set E has bandwidth constraints, the maximum limit of user tasks that can be transmitted is $\Sigma_{i \in \mathcal{N}_l} \text{trans}(i) < c_l$, $l \in \varepsilon$, where $c_l$ is the actual bandwidth parameter of the system network and $N_l$ is the set of all users using the link l; each edge server in V has computational bandwidth constraints, and the maximum number of user tasks it can carry is $\Sigma_{i \in \mathcal{N}_v} \text{comp}(i) < c_v$, $v \in \mathcal{V}$, where $c_v$ is the actual performance parameter of the system edge server and $\mathcal{N}_v$ is the set of all users when performing task calculations on edge server v.

(4) optimizing and solving the fair utility evaluation function, the migration path for each user task request can be determined, the specific implementation is as follows:

We define the server computing load as: $\Sigma_{i \in \mathcal{D}_j} \text{workload}_{i,j} + (\text{workload}_j^{in} - \text{workload}_j^{out})$, where $\mathcal{D}_j$ represents the set of users connected by server j, $\text{workload}_{i,j}$ represents the amount of tasks unloaded by user i to server j, $\text{workload}_j^{in}$ represents the amount of tasks transferred by other servers to server j, and $\text{workload}_j^{out}$ represents the amount of tasks transferred by server j to other servers.

Task offloading refers to the ability of users to send tasks to designated edge servers for execution within the service scope of the edge server; task migration refers to the migration of user task to an edge server other than themselves after offloading the destination server and transferring the task from one edge server to another; through the above task offloading and task migration, computing tasks of the users can ultimately reach a certain server for task execution.

The above task transmission path search algorithm is as follows: firstly, i represents the user index, m represents the server index, defined $S_m$ as the set of adjacent servers within one hop of server m, defined $O_i^c$ as the set of servers that cover service scope of user i, and the set of server indexes that can execute user i's tasks is $O_i^e$, then $O_i^{c-e}=O_i^c \setminus O_i^e$ represents servers that is directly connected to the user, but cannot execute the tasks submitted by user i. Using $O_i^{ce}=O_i^c \cap O_i^e$ represents servers that is directly connected to the user i, and the servers are capable of performing tasks offloaded by user i.

Adding the direct link between the server and the user in $O_i^{ce}$ to the set $E_i^{direct}$, traversing the server index of $O_i^{c-e}$, and recording as z, defining a set $E_1^{migration}=z \times S_z \cap O_i^e$; traversing the server index of $O_i^{ce}$, and recording as j, defining a set $E_2^{migration}=j \times S_j \cap O_i^e$.

The first part of the migration link set (the paths composed of user nodes and the first server nodes that cannot perform tasks, as well as a server node with task services) is $E_1^{migration}$ the second part of the migration link set (the paths composed of user nodes and server nodes that can perform services). From the above steps, the migration path set that user i can perform task transmission is: $E_i^{direct} \cup E_1^{migration} \cup E_2^{migration}$.

Figure 1A:
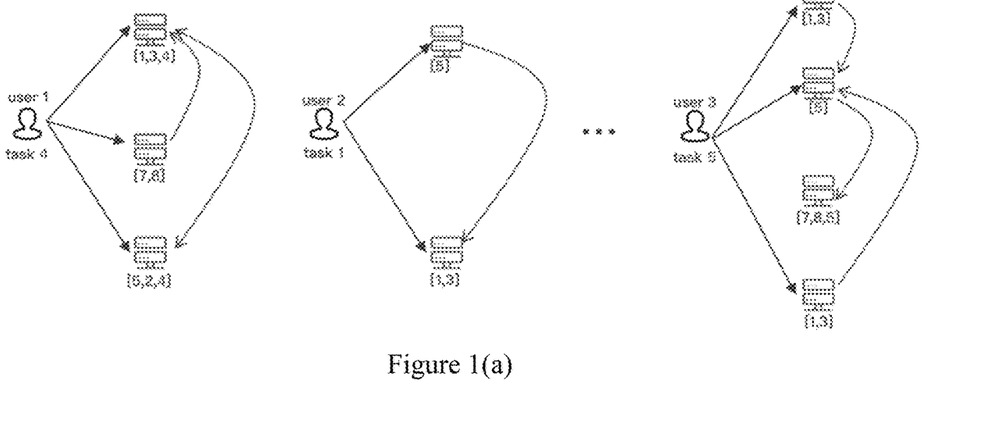

Decomposing the feasible connection graph of each user (i.e. FIG. 1 (a)) to obtain the feasible connection subgraph of each user (i.e. FIG. 1 (b)), combining the information extraction of each user's feasible connection graph, performing edge and fixed point feature learning on each user's subgraph, and obtaining the graph embedding feature information of each user's task migration path in FIG. 1 (b). On the basis of embedding feature information in the connection feasibility map of all users at all current times, prioritizing the current users, and users with higher priority can perform task offloading and execution; once the user offloads the task, based on the embedding feature information in the user subgraph, a feasible task execution plan is selected, which is to assign an edge server to the task for task offload, if the task needs to be migrated, the edge server for task migration is also specified. The optional execution strategy scheme for user tasks consists of all possible migration paths for the tasks, as shown in FIG. 1 (b). Task 4 of user 1 can be executed by migrating three migration strategies: subgraph 1, subgraph 2, and subgraph 3 to the edge server; using $e_{i,s}$ represents a graph encoding feature vector of the task migration path s of user i, the set of feasible execution migration paths for user i's task is $\mathcal{S}_i$, where s belongs to $\mathcal{S}_i$.

The following is a detailed description of two types of embedding encoding information for the edge server network system, including embedding encoding information for each element node in the user feasible migration subgraph and embedding encoding information for each element node in the edge network global graph.

Embedding encoding information for feasible migration subgraphs for user i:

The set of all links in the feasible migration subgraph for user i is $\varrho$, the set of servers is $\varphi$, and the feature vectors of user nodes in the migration path are $u_i$: the feature vector $fea_l = [o_l^1, o_l^2, \ldots, o_l^{|\mathcal{N}_l|}]$, $o_l^n (n \in \mathcal{N}_l)$ of the link l represents the bandwidth resources occupied by the user n on the link l, while the feature vector of the server c is $fea_c = [p_c^1, p_c^2, \ldots, p_c^{|\mathcal{N}_v|}]$, $p_c^n (n \in \mathcal{N}_v)$ represents the computing resources occupied by user n on the server c. Using a graph neural network g( ) to calculate the embedding encoding information $[\overline{w}_i^{sub}, \overline{w}_c^i, \overline{w}_l^i] = g(u_i, F_l, F_c)$ of all element nodes (users, links, servers) in the migration subgraph of user i, $fea_l \in F_l$, $fea_c \in F_c$, $F_l$ and $F_c$ represent the set of feature vectors for all links and servers in the feasible migration subgraph. $\overline{w}_c^i = [c_1, c_2, \ldots, c_{|\varrho|}]$, $\overline{w}_l^i = [l_1, l_2, \ldots, l_{|\varphi|}]$, $c_k(k \in \varphi)$ is embedding encoding information for servers, $l_k(k \in \varrho)$ is embedding encoding information for links, $\overline{w}_i^{sub}(i \in \mathcal{N})$ is embedding encoding information for users, $|\varrho|$ represents the size of the set of links, and $|\varphi|$ represents the size of the set of servers.

For global edge network embedding encoding information:

The feature vector of the link l is $fea_l = [o_l^1, o_l^2, \ldots, o_l^{|\mathcal{N}|}]$, $o_l^n$, $n \in \mathcal{N}$ represents the bandwidth resources occupied by the user n on the link l. The feature vector of the server c is $fea_c = [p_c^1, p_c^2, \ldots, p_c^{|\mathcal{N}|}]$, $p_c^n (n \in \mathcal{N})$ represents the computational resources occupied by user n on the server c. Using the graph neural network f( ) to calculate the embedding encoding information $[\overline{w}_u^g, \overline{w}_c^g, \overline{w}_l^g] = g(u_i, F_l, F_c)$ of all element nodes (users, links, servers) in the migration subgraph of user i, $fea_l \in F_l$, $fea_c \in F_c$, $F_l$ and $F_c$ represent the set of feature vectors for all links and servers in the feasible migration subgraph. $\overline{w}_c^g = [c_1, c_2, \ldots, c_{|\mathcal{V}|}]$, $c_k$ ($k \in \mathcal{V}$) is the embedding encoding information for all servers, $|\mathcal{V}|$ represents the size of the set of links; $\overline{w}_l^g = [l_1, l_2, \ldots, l_{|\varepsilon|}]$, $l_k(k \in \varepsilon)$ is the embedding encoding information for links, $\overline{w}_u^g = u_1, u_2, \ldots, U_{|\mathcal{N}|}]$ is embedding encoding information for all users, $|\varepsilon|$ representing the size of the set for all servers.

Embedding encoding information after CNN network aggregation:

The input of the CNN network is the $[\overline{w}_i^{sub}, \overline{w}_c^i, \overline{w}_l^i]$ of the feasible migration subgraph of all users and the $[\overline{w}_u^g, \overline{w}_c^g, \overline{w}_l^g]$ of the global edge network, the output of the CNN network is $[\overline{w}_u, \overline{w}_l, \overline{w}_c]$, where $\overline{w}_u$ represents the embedding encoding information of all users after aggregation, $\overline{w}_l$ represents the embedding encoding information of all links after aggregation, and $\overline{w}_c$ represents the embedding encoding information of all servers after aggregation.

Using $R_i = [e_i^1, e_i^2, \ldots, e_i^s, \ldots, e_i^{|S_i|}]$ represent a set of feature vectors of the task migration path of user i, starting from the migration user, the edge server nodes of the user, task migration link, task path, and the edge server node that the task finally reaches as elements in the set; if task migration path of user is $\in E_i^{direct}$, the feature vector is $e_i^s = [\overline{w}_u(i, s), \overline{w}_l(i, s), \overline{w}_c(i, s), 0, 0]$, otherwise $s \in E_1^{migration} \cup E_2^{migration}$, the feature vector is:

$$e_i^s = [\overline{w}_u(i,s), \overline{w}_l(i,s), \overline{w}_c(i,s), \overline{w}_{l'}(i,s), \overline{w}_{c'}(i,s)]$$

among them: $\overline{w}_u(i, s)$ represents the embedding encoding information of user i on the migration path s, $\overline{w}_l(i, s)$ and $\overline{w}_c(i, s)$ respectively represents the embedding encoding information of server c and link l belonging to user i's task migration path s, and l' and c' represents the link and server of the second hop of user i's task migration path s.

Figure 2:
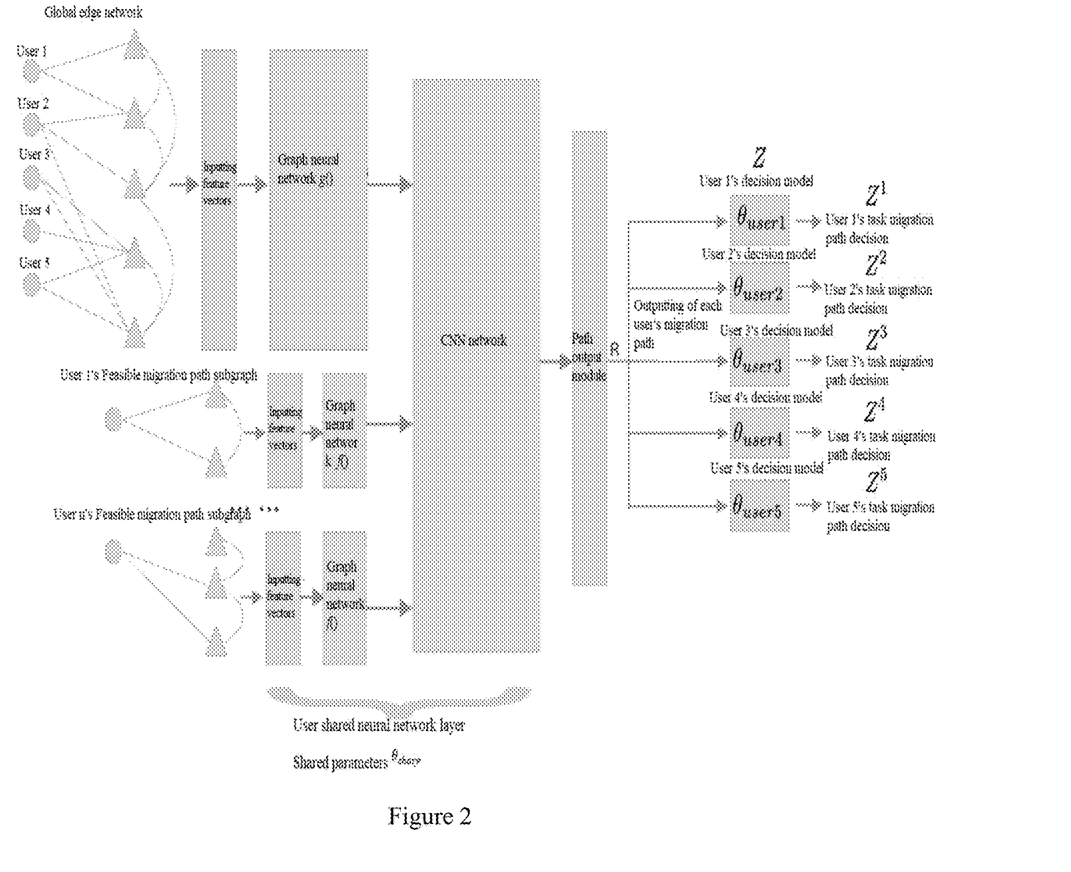
FIG. 2 is a schematic diagram of the neural network algorithm framework for calculating user migration path decisions.

As shown in FIG. 2, $R = \{R_1, R_2, \ldots, R_i, \ldots, R_N\}$ is defined as a set of feature vectors for each user's migration path, Z represents the output of each user's decision model, the i-th user component Z' in Z represents the user's task migration path decision vector.

We aim to maximize fairness for all users, and in the design of the present invention, the system uses the fair utility function value generated by the decision as the evaluation criterion; after the system makes a decision, if all users' fair utility can increase, the system reward function value is $(U_i(t+1) - U_i(t)) * \eta$, which $\eta$ is a constant, otherwise, the reward function value for the user is 0. The system is modeled by maximizing the reward function value as a reward in the reinforcement learning model.

The specific description of the system reward function is:

$$r_i = \frac{1}{T} \sum_t \max\{\eta(U_i(t+1) - U_i(t)), \delta\}$$

wherein: $\delta$ is a smaller positive number, and is a given parameter.

The goal of the reinforcement learning algorithm of the present invention is to maximize the reward function. The system uses the policy gradient method to train the offloading and transfer decisions of user tasks, and defines the parameters in the user decision model neural network as $\theta_{user\ i}$. So policy represents the probability that the system will take action $a_t$ during the state $s_t$, with a value of $\pi\theta_{user\ i}(s_t, a_t)$, where action refers to the server selection and migration path selection for the system to offload user tasks. In the operation of the system, each user decision model adopts a formula to update the neural network parameters $\theta_{user\ i}$ of the decision model:

$$\theta_{user\ i} = \theta_{user\ i} + \alpha \sum_{t \in T} \nabla_{\theta_{user\ i}} \log \pi_{\theta_{user\ i}}(s_t, a_t) \left( \sum_{t'=t}^{|T|} r_{t'} - b_t \right),$$

$\alpha$ represents a customized learning rate parameter, and $b_t$ represents a benchmark value $b_t = \Sigma_{t' \in t} r_{t'}$ defined to reduce the average user reward generated by the decision.

The above reinforcement learning algorithm ensures the maximum fair utility function value for all users, but cannot guarantee that the utility of each user is the fairest state; in order to obtain Pareto optimality for all users, the present invention proposes a Pareto fairness algorithm for calculating neural network parameters. As shown in FIG. 2, the parameters of the neural network graph f(·), g(·) table and CNN network are merged and defined as shared parameters $\theta_{share}$, which R are the output of the user shared neural network layer, and $L_i = r_i$ is the loss function corresponding to user i, once the reinforcement learning algorithm mentioned above is updated $\theta_{user\ i}$, $\alpha_1, \alpha_2, \ldots, \alpha_n$ are solved using the FRANK WOLFE SOLVER method:

$$\min \left\| \sum_{i \in N} \alpha_i \nabla_R \mathcal{L}_i((\theta_{share}, \theta_{user\ i})) \right\|^2 \sum_{2 \atop i \in N} \alpha_i = 1$$

among them, ε represents the accuracy requirements of the system and the set system parameters, after multiple iterations of the algorithm steps mentioned above, if the accuracy requirements of the above equation are still met, then the system assumes that all users have met the Pareto fairness requirements, and the shared parameters at this time are $\theta_{share}$.

The set of migration paths for user feasible task transmission is defined as $E_i = E_i^{direct} \cup E_1^{migration} \cup E_1^{migration}$, where the elements of the output vector of the neural network system shown in FIG. 2 correspond one-to-one to the decision vector $Z_i$ of the task migration path for each user i, each element in the $Z_i$ is used as a judgment value for whether each task path is selected for $E_i$, which $Z_i^k$ represents the judgment value of the kth feasible task migration path $E_i$ selected by user i.

The present invention designs an optimal sorting function tpk(X)=X/k, which returns the average value of the largest first k components in the input vector, defining the user who prioritizes the task migration path in each iteration of the system as $i^* = \mathrm{argmax}_i\{V_1, V_2, \ldots, V_n\}$, $V = [\mathrm{tpk}(Z^1), \mathrm{tpk}(Z^2), \mathrm{tpk}(Z^3), \ldots, \mathrm{tpk}(Z^N)]$. Once the user is selected, the system assigns the optimal task migration path to them, using the largest component $k = \mathrm{argmax}_k \{Z_i^k\}$ in each user's decision vector as the final selected task migration path index for each user, selecting the k-th migration path in the set $E_i$ of migration paths for user i's task transmission.

Under the constraint conditions $\Sigma_{i \in \mathcal{N}_l} \mathrm{trans}(i) < c_l$, $l \in \varepsilon$ and $\Sigma_{i \in \mathcal{N}_v} \mathrm{comp}(i) < c_v$, $v \in \mathcal{V}$, repeating the above selection until any constraint is not met. At this point, the path selection decision vectors for each user are obtained, and users without assigned migration paths choose to execute locally.

According to the neural network algorithm framework shown in FIG. 2, backpropagation training is conducted. On the premise of meeting the accuracy requirements ε, the edge network is simulated for user task input until the system reward function tends to converge. At this time, the parameters in the neural network are used as the final parameters of the edge network user task utility fairness load transfer method.

The above description of the embodiments is for the convenience of ordinary technical personnel in the art to understand and apply the present invention. Those familiar with the art can clearly make various modifications to the above embodiments and apply the general principles explained here to other embodiments without the need for creative labor. Therefore, the present invention is not limited to the aforementioned embodiments. According to the disclosure of the present invention, the improvements and modifications made by those skilled in the art should be within the scope of protection of the present invention.

The invention claimed is:

1. A fair task offloading and migration method for edge service networks, comprising the following steps:
   (1) detecting task requests of mobile users in the edge network, and determining all currently detected user task requests;
   (2) enumerating migration paths of all user task requests transmitted to the edge server;
   (3) establishing a fair utility evaluation function for evaluating user tasks, wherein, an expression of the fair utility evaluation function is as follows:

$$\max\ U = (U_1, \ldots, U_N)^T$$

$$U_i = \sum_{k \in \mathcal{K}} w_k U_i^k,\ U_i^k = \frac{x_{i,k}^{1-\alpha_i^k}}{1-\alpha_i^k}$$

$$\sum_{i_l \in \mathcal{N}_l} \mathrm{trans}(i_l) < c_l,\ l \in \varepsilon$$

$$\sum_{i_v \in \mathcal{N}_v} \mathrm{comp}(i_v) < c_v,\ v \in \mathcal{V}$$

among them: $U_i$ is the utility function for executing the i-th user task request, if the i-th user task request cannot be unloaded and executed, then $U_i = U_l$, and $U_l$ is a constant, i is a natural number and $1 \leq i \leq N$, N is the number of all users, $U_i^k$ is the utility value of resource k occupied by executing the i-th user task request, $w_k$ represents the weight of resource k, and $\mathcal{K}$ is the resource set, comprising bandwidth resources and computing resources, $\alpha_i^k$ represents a custom parameter for the personalized utility function of resource k for the i-th user task request, and $x_{i,k}$ represents the quantity value of resource k occupied by the i-th user task request; l represents any transmission link in the edge network, ε represents a set of transmission links in the edge network, v represents any edge server in the edge network, $\mathcal{V}$ represents a set of edge servers in the edge network, $\mathcal{N}_l$ is the set of all user task requests that occupy the transmission link l, $\mathcal{N}_v$ is the set of all user task requests that are calculated on the edge server v, $i_l$ is any user task request in the set $\mathcal{N}_l$, $i_v$ is any user task request in the set $\mathcal{N}_v$, $\mathrm{trans}(i_l)$ is the amount of the bandwidth resource occupied by the user task request $i_l$ on the transmission link l, $\mathrm{comp}(i_v)$ is the amount of the computational resource occupied by the user task request $i_v$ on the edge server v, $c_l$ is the actual bandwidth upper limit of the transmission link l, and $c_v$ is the actual maximum computing power of the edge server v;

(4) optimizing and solving the fair utility evaluation function, the migration path for each user task request can be determined, wherein, the specific process of optimizing and solving the fair utility evaluation function in step (4) is as follows:

4.1. establishing a user shared neural network layer and N user decision models, wherein the user shared neural network layer comprises a graph neural network and a nonlinear aggregation function, N represents the number of all users;

4.2. using the graph neural network to extract information about nodes and edges in the edge network, and combining this information into feature vectors; the nodes correspond to mobile users and edge servers in the edge network, and the edges correspond to the transmission links between mobile users and edge servers, as well as the transmission links between edge servers;

4.3 using the graph neural network to extract information about nodes and edges in the task feasible migration path subgraph, and combining the information into feature vectors;

4.4 for any migration path in the task feasible migration path subgraph, the graph neural network is used to extract the information of nodes and edges, and the information are combined into feature vectors;

4.5 inputting all the extracted feature vectors into each user decision model, and the user decision model outputs the selected probability of each migration path corresponding to the user task requests;

4.6 first determining the priority of each user task request for offloading, then determining the offloading migration path for each user's task request, and then offloading each user's task request based on the priority and offloading migration path;

wherein, the task feasible migration path subgraph corresponds one-to-one with the user task requests, which is composed of all user task migration paths corresponding to the request, the user task migration path represents a specific migration path used by the user task request to perform offloading.

2. The fair task offloading and migration method for edge service networks according to claim 1, wherein, for any user task request in step (2), the following three types of migration paths are enumerated:

E1 is a set of migration paths for edge servers directly connected to users;

E2 is a set of migration paths for edge servers that are indirectly connected to users in a single hop manner, and edge servers that are directly connected to users do not have processing capabilities;

E3 is a set of migration paths for edge servers that are indirectly connected to users in a single hop manner, and edge servers that are directly connected to users have processing capabilities.

3. The fair task offloading and migration method for edge service networks according to claim 1, wherein, the information of the edges comprises the bandwidth occupied by each user task request on the transmission links between the mobile users and the edge servers, as well as the actual bandwidth upper limit of the transmission links; the information of the nodes comprises the amount of computing resources required for user task requests and the actual maximum computing power of the edge servers.

4. The fair task offloading and migration method for edge service networks according to claim 1, wherein, the parameters $\theta_{user\ i}$ of the user decision model are optimized and solved through a reward function;

$$r_i = \frac{1}{T}\sum_t \max\{\eta(U_i(t+1) - U_i(t)), \delta\}$$

among them, $r_i$ represents the reward function of the i-th user decision model, $U_i(t+1)$ and $U_i(t)$ represents the utility function of executing the i-th user task request during the t+1 and t iterations, respectively, $\eta$ is a given parameter, t is a natural number, T is the total number of iterations, and $\delta$ is a positive smaller given parameter.

5. The fair task offloading and migration method for edge service networks according to claim 4, wherein, the parameters of the user shared neural network layer are iterated through the following formula until the utility function of all user task requests reaches Pareto optimality;

$$\theta_{share}(t+1) = \theta_{share}(t) - \sum_i \alpha_i \nabla_R \mathcal{L}_i(\theta_{share}, \theta_{user\ i})$$

among them, $\theta_{share}(t+1)$ and $\theta_{share}(t)$ represent the parameters of the user shared neural network layer during the t+1 and t iterations, respectively, $\alpha_i$ is the weight value of the reward function for the i-th user decision model, $\nabla_R$ represents calculating the partial derivative, $\mathcal{L}_i(\theta_{share}, \theta_{user\ i}) = 1/r_i$.

6. The fair task offloading and migration method for edge service networks according to claim 5, wherein, the weight value $\alpha_i$ is obtained by solving the following loss function by using the Frank Wolfe algorithm;

$$\min \left\| \sum_i \alpha_i \nabla_R \mathcal{L}_i(\theta_{share}, \theta_{user\ i}) \right\|_2^2$$

wherein, $\| \ \|_2$ represents a 2-norm.

7. The fair task offloading and migration method for edge service networks according to claim 1, wherein, in step 4.6, for the selected probabilities of all migration paths requested by any user task, the highest of the first K selected probabilities is averaged as the priority for offloading the user task request, the migration path corresponding to the highest selected probability is taken as the offloading migration path by the user task request, with K being a natural number greater than 1.

* * * * *